US012675916B2

(12) United States Patent
Ahn et al.

(10) Patent No.: US 12,675,916 B2
(45) Date of Patent: Jul. 7, 2026

(54) METHOD AND APPARATUS FOR LiDAR POINT CLOUD CODING

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 125 days.

(21) Appl. No.: 18/652,147

(22) Filed: May 1, 2024

(65) Prior Publication Data

US 2024/0289992 A1     Aug. 29, 2024

Related U.S. Application Data

(63) Continuation of application No. PCT/KR2022/014066, filed on Sep. 21, 2022.

(30) Foreign Application Priority Data

Nov. 19, 2021     (KR) ......................... 10-2021-0160558
Sep. 20, 2022     (KR) ......................... 10-2022-0118317

(51) Int. Cl.
*G06T 9/00*          (2006.01)
*G06T 17/00*         (2006.01)

(52) U.S. Cl.
CPC ................ *G06T 9/00* (2013.01); *G06T 17/00* (2013.01); *G06T 2210/56* (2013.01)

(58) Field of Classification Search
None
See application file for complete search history.

(56) References Cited

U.S. PATENT DOCUMENTS

| 10,834,375 | B2 | 11/2020 | Oh |
| 11,706,458 | B2 | 7/2023 | Wang |
| 11,856,230 | B2 | 12/2023 | Wang |
| 2018/0097867 | A1* | 4/2018 | Pang .................... H04N 5/2226 |

(Continued)

FOREIGN PATENT DOCUMENTS

| JP | 2021162923 A | 10/2021 |
| KR | 20200005438 A | 1/2020 |

(Continued)

OTHER PUBLICATIONS

International Search Report and Written Opinion cited in corresponding international patent application No. PCT/KR2022/014066; Jan. 5, 2023; 12 pp.

*Primary Examiner* — Joni Hsu
(74) *Attorney, Agent, or Firm* — Lempia Summerfield Katz LLC

(57)          ABSTRACT

A LiDAR point cloud coding method includes determining, from LiDAR information, a coding block that is a point cloud encoding/decoding unit, to improve the LiDAR point cloud coding efficiency. The LiDAR point cloud coding method also includes encoding/decoding points on a per coding block basis.

14 Claims, 9 Drawing Sheets

(56) References Cited

U.S. PATENT DOCUMENTS

| | | | |
|---|---|---|---|
| 2020/0014905 A1 | 1/2020 | Oh | |
| 2020/0394822 A1 | 12/2020 | Gao | |
| 2021/0112278 A1 | 4/2021 | Wang | |
| 2021/0112280 A1 | 4/2021 | Wang | |
| 2021/0112281 A1 | 4/2021 | Wang | |
| 2021/0166436 A1* | 6/2021 | Zhang | G06T 9/40 |
| 2023/0091030 A1 | 3/2023 | Unno | |
| 2023/0290007 A1* | 9/2023 | Yang | H04N 19/597 |
| 2023/0291895 A1* | 9/2023 | Lee | H04N 19/96 |
| 2023/0328291 A1 | 10/2023 | Wang | |

FOREIGN PATENT DOCUMENTS

| | | |
|---|---|---|
| KR | 20200108548 A | 9/2020 |
| KR | 20210022090 A | 3/2021 |

* cited by examiner

Coding block

Coding block skip, 8, a, skip, 3, b, EOB

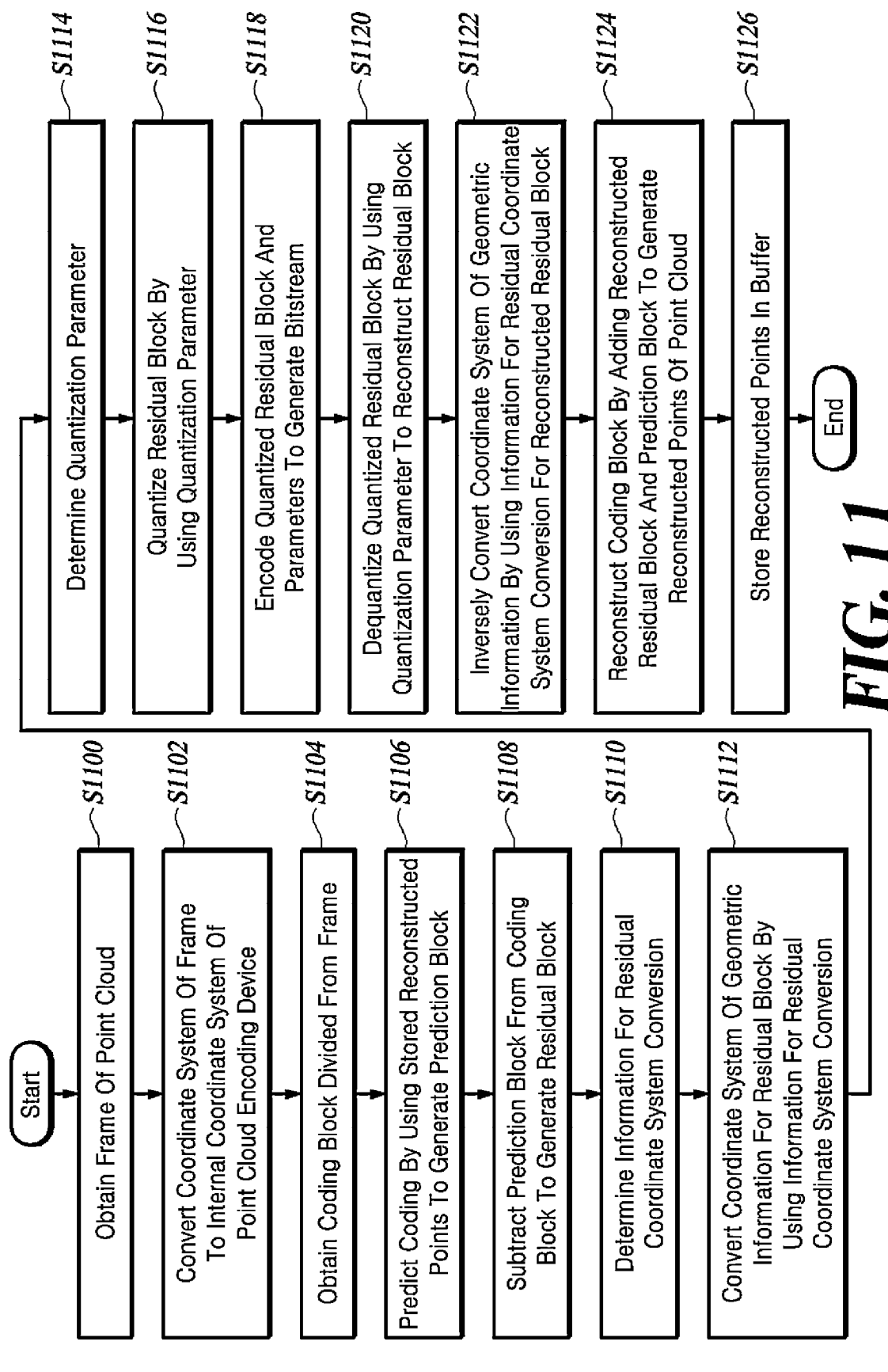

FIG. 11

S1100 — Obtain Frame Of Point Cloud

S1102 — Convert Coordinate System Of Frame To Internal Coordinate System Of Point Cloud Encoding Device S1104 — Obtain Coding Block Divided From Frame S1106 — Predict Coding By Using Stored Reconstructed Points To Generate Prediction Block S1108 — Subtract Prediction Block From Coding Block To Generate Residual Block S1110 — Determine Information For Residual Coordinate System Conversion S1112 — Convert Coordinate System Of Geometric Information For Residual Block By Using Information For Residual Coordinate System Conversion S1114 — Determine Quantization Parameter S1116 — Quantize Residual Block By Using Quantization Parameter S1118 — Encode Quantized Residual Block And Parameters To Generate Bitstream S1120 — Dequantize Quantized Residual Block By Using Quantization Parameter To Reconstruct Residual Block S1122 — Inversely Convert Coordinate System Of Geometric Information By Using Information For Residual Coordinate System Conversion For Reconstructed Residual Block S1124 — Reconstruct Coding Block By Adding Reconstructed Residual Block And Prediction Block To Generate Reconstructed Points Of Point Cloud S1126 — Store Reconstructed Points In Buffer Start End

METHOD AND APPARATUS FOR LiDAR POINT CLOUD CODING

CROSS-REFERENCE TO RELATED APPLICATIONS

This application is a continuation of International Application No. PCT/KR2022/014066 filed on Sep. 21, 2022, which claims priority to and the benefit of Korean Patent Application No. 10-2021-0160558, filed on Nov. 19, 2021, and Korean Patent Application No. 10-2022-0118317, filed on Sep. 20, 2022, the entire contents of each of which are incorporated herein by reference.

TECHNICAL FIELD

The present disclosure relates to a light detection and ranging (LiDAR) point cloud coding method and an apparatus.

BACKGROUND

The statements in this section merely provide background information related to the present disclosure and do not necessarily constitute prior art.

Conventional point cloud compression technology performs encoding and decoding on point clouds obtained during a specific time. A point cloud obtained during a specific time is called a frame, and when point clouds are obtained continuously, multiple frames may exist. Additionally, with one frame turned into one tile or slice or divided into one or multiple tiles or slices, encoding/decoding of points within each tile or each slice may be performed.

Encoding/decoding on a frame, tile, or slice may be performed point by point. At this time, encoded/decoded first may be the geometric information which is the location information of the point. The reconstructed geometric information may then be utilized to encode/decode the attribute information of the point. The attribute information of a point may include a plurality of attribute values, such as red, green, blue (RGB) color information, reflection coefficient of LiDAR, and the like.

SUMMARY

To improve this point cloud coding efficiency, the encoding/decoding method performed point by point within a frame/tile/slice needs to be improved.

Embodiments of the present disclosure provide a LiDAR point cloud coding method and a device for determining, from LiDAR information, a coding block, that is a point cloud encoding/decoding unit, to improve the LiDAR point cloud coding efficiency. The LiDAR point cloud coding method and the device encode/decode points on a per coding block basis.

At least one aspect of the present disclosure provides a method performed by a point cloud decoding device for decoding a point cloud. The method includes decoding a quantized residual block and a quantization parameter from a bitstream. The method also includes reconstructing a residual block by dequantizing the quantized residual block by using the quantization parameter. The method additionally includes generating a prediction block of a coding block by predicting the coding block by using stored reconstructed points. The method further includes generating reconstructed points within a frame of the point cloud by reconstructing the coding block by adding the residual block and the prediction block. The method also includes storing the reconstructed points in a buffer and converting a coordinate system of the reconstructed points stored in the buffer.

Another aspect of the present disclosure provides a method performed by a point cloud encoding device for encoding a point cloud. The method includes obtaining a frame of the point cloud and converting a coordinate system of the frame into a coordinate system internal to the point cloud encoding device. The method also includes obtaining a coding block divided from the frame and generating a prediction block of the coding block by predicting the coding block by using stored reconstructed points. The method additionally includes subtracting the prediction block from the coding block to generate a residual block. The method further includes determining a quantization parameter, quantizing the residual block by using the quantization parameter, and encoding a quantized residual block and the quantization parameter.

Yet another aspect of the present disclosure provides a computer-readable recording medium storing a bitstream generated by a point cloud encoding method. The point cloud encoding method includes obtaining a frame of a point cloud and converting a coordinate system of the frame into a coordinate system internal to a point cloud encoding device. The point cloud encoding method also includes obtaining a coding block divided from the frame and generating a prediction block of the coding block by predicting the coding block by using stored reconstructed points. The point cloud encoding method additionally includes subtracting the prediction block from the coding block to generate a residual block. The point cloud encoding method also includes determining a quantization parameter, quantizing the residual block by using the quantization parameter, and encoding a quantized residual block and the quantization parameter.

As described above, the present disclosure provides a LiDAR point cloud coding method and a device for determining, from LiDAR information, a coding block that is a point cloud encoding/decoding unit, and then encoding/decoding points on a per coding block basis. Thus, the LiDAR point cloud coding method and device improve the LiDAR point cloud coding efficiency.

BRIEF DESCRIPTION OF THE DRAWINGS

FIG. 11 is a flowchart of a method of encoding a LiDAR point cloud, according to at least one embodiment of the present disclosure.

DETAILED DESCRIPTION

Figure 1:
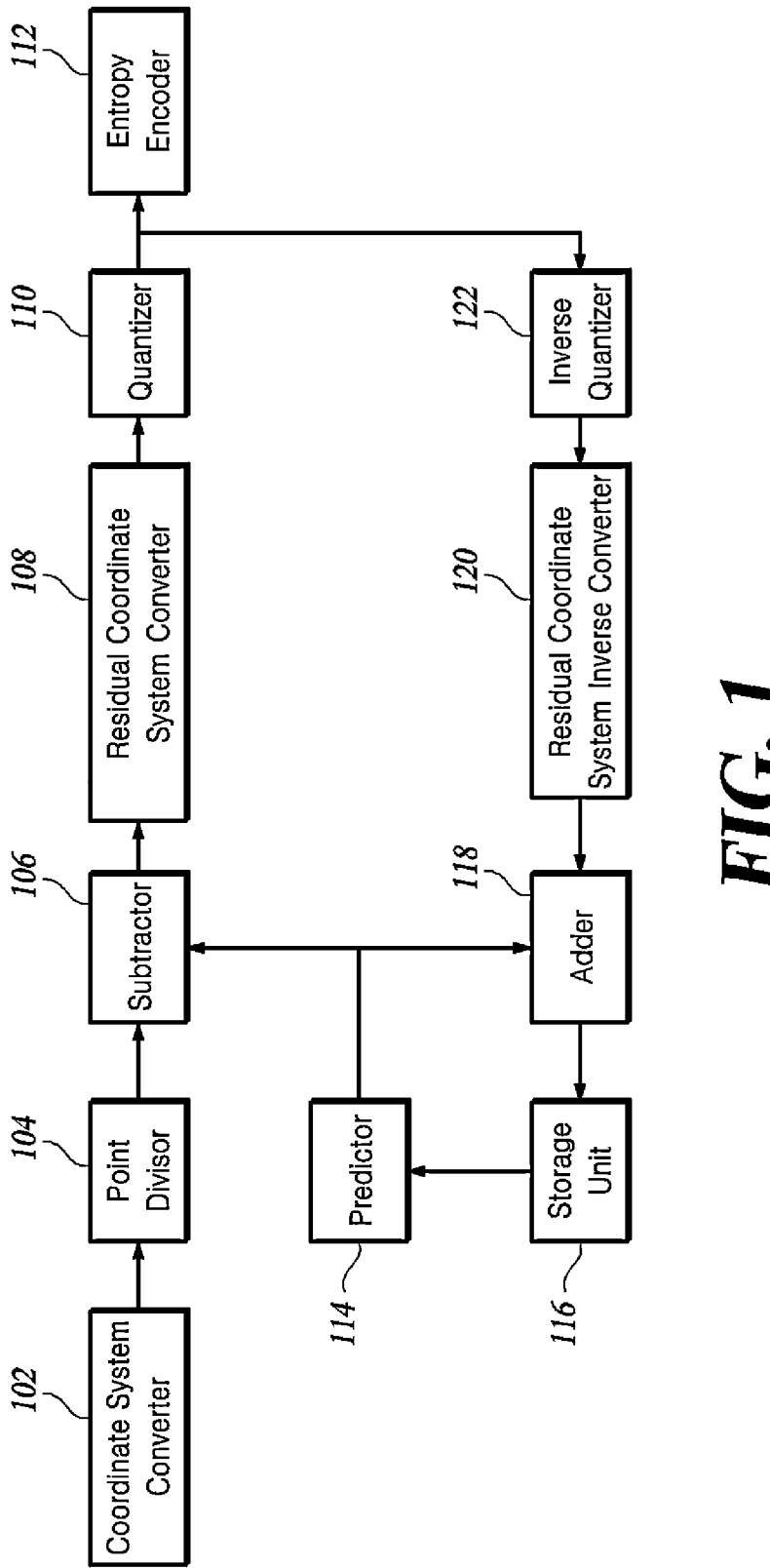
FIG. 1 is a block diagram of a point cloud encoding device, according to at least one embodiment of the present disclosure.

Hereinafter, embodiments of the present disclosure are described in detail with reference to the accompanying illustrative drawings. In the following description, like reference numerals designate like elements even when the elements are shown in different drawings. Further, in the following description of embodiments, detailed descriptions of related known components and functions, when considered to obscure the subject of the present disclosure, may have been omitted for the purpose of clarity and for brevity.

In the following description, when a component, device, element, or the like of the present disclosure is described as having a purpose or performing an operation, function, or the like, the component, device, or element should be considered herein as being "configured to" meet that purpose or perform that operation or function.

Embodiments of the present disclosure provide a method and a device for LiDAR point cloud coding. More specifically, a LiDAR point cloud coding method and a device are provided for determining a coding block, that is a point cloud encoding/decoding unit, from LiDAR information, and then encoding/decoding points on a per coding block basis.

FIG. 1 is a block diagram of a point cloud encoding device, according to at least one embodiment of the present disclosure.

The point cloud encoding device (hereinafter, used interchangeably with the 'encoding device') according to this embodiment determines a coding block, that is an encoding unit of a point cloud, from the LiDAR parameters, and then encodes the points on a per coding block basis. The encoding device may include all or some of a coordinate system converter 102, a point divisor 104, a subtractor 106, a residual coordinate system converter 108, a quantizer 110, an entropy encoder 112, a predictor 114, a storage unit 116, an adder 118, a residual coordinate system inverse converter 120, and an inverse quantizer 122.

The coordinate system converter 102 obtains the frame of a point cloud on a per certain time basis. The point cloud may have different coordinate systems depending on the output format of the LiDAR. Therefore, with the frame of the point cloud, there is a need to convert the coordinate system of geometric information from the coordinate system of the point cloud to the coordinate system used inside the encoding device. The coordinate system converter 102 converts the coordinate system to suit the encoding device and then transmits the converted frame to the point divisor 104.

The point divisor 104 may turn or divide the frame of the coordinate-system converted point cloud into one or multiple slices or tiles. Additionally, the point divisor 104 may turn or divide each tile or slice into one or multiple coding blocks. Here, tiles, slices, and coding blocks may mean three-dimensional data. In some cases, points may not exist at all locations in 3D data. For example, data may exist only in some locations. Each of the divided coding blocks may be provided to the subtractor 106.

The subtractor 106 may subtract a prediction block from the coding block to generate a residual block. The subtractor 106 may then provide the residual block to the residual coordinate system converter 108. The prediction block may be provided by the predictor 114.

The residual coordinate system converter 108 may convert the coordinate system of the residual block into an efficient coordinate system in terms of encoding. In an embodiment, the coordinate system conversion may be applied to the geometric information of the residual block by converting the coordinate system exclusive to the residual values. Alternatively, coordinate system-conversion performed on the residual values of the geometric information, and recalculation or filtering based on the converted geometric information, performed on the attribute information of the residual block, may result in a modified attribute information. The coordinate system-converted residual block may be provided to the quantizer 110. The information for the residual coordinate system conversion may be encoded by the entropy encoder 112 and then transmitted to a point cloud decoding device.

The quantizer 110 may quantize the residual block by using a quantization parameter and then may provide the quantized block to the entropy encoder 112 and the inverse quantizer 122. The quantization parameter may be determined in terms of optimizing coding efficiency, for example. The quantization parameter may be encoded by the entropy encoder 112 and then transmitted to the point cloud decoding device.

The entropy encoder 112 may entropy encode all data of the quantized residual block to generate a bitstream. In an embodiment, for entropy encoding, the entropy encoder 112 may use arithmetic encoding based on a plurality of symbols adaptive to the context. Alternatively, the entropy encoder 112 may use Context Adaptive Binary Arithmetic Coding (CABAC) to encode the quantized residual block. Alternatively, the entropy encoder 112 may use a deep neural network trained by using a large number of training data. Alternatively, the entropy encoder 112 may use run-length encoding. Alternatively, the entropy encoder 112 may use entropy encoding based on a plurality of symbols from the Asymmetric Numeral System (ANS) series.

The entropy encoder 112 may encode parameters related to the encoding of coding blocks and may add the encoded parameters to the bitstream. The parameters include a quantization parameter and information for a residual coordinate system conversion. Depending on the encoding method of the coding block, parameters may include additional information as described in more detail below.

The inverse quantizer 122 may inversely quantize the quantized residual block by using the quantization parameter, thereby reconstructing the residual block. The reconstructed residual block may be provided to the residual coordinate system inverse converter 120.

The residual coordinate system inverse converter 120 may inversely convert the coordinate system of geometric information for the reconstructed residual block and then may provide the inversely converted coordinate system to the adder 118.

The adder 118 may sum the coordinate system inverse-converted residual block and the prediction block received from the predictor 114 to reconstruct the current coding block. The reconstructed coding block may be provided to the storage unit 116.

The storage unit 116 may store the reconstructed coding block in a buffer. The storage unit 116 may provide one or more stored points and one or more stored blocks to the predictor 114.

The predictor 114 may use the stored reconstructed points to predict the current coding block and thereby generate a prediction block. The generated prediction block may be provided to the subtractor 106 and the adder 118.

Figure 2:
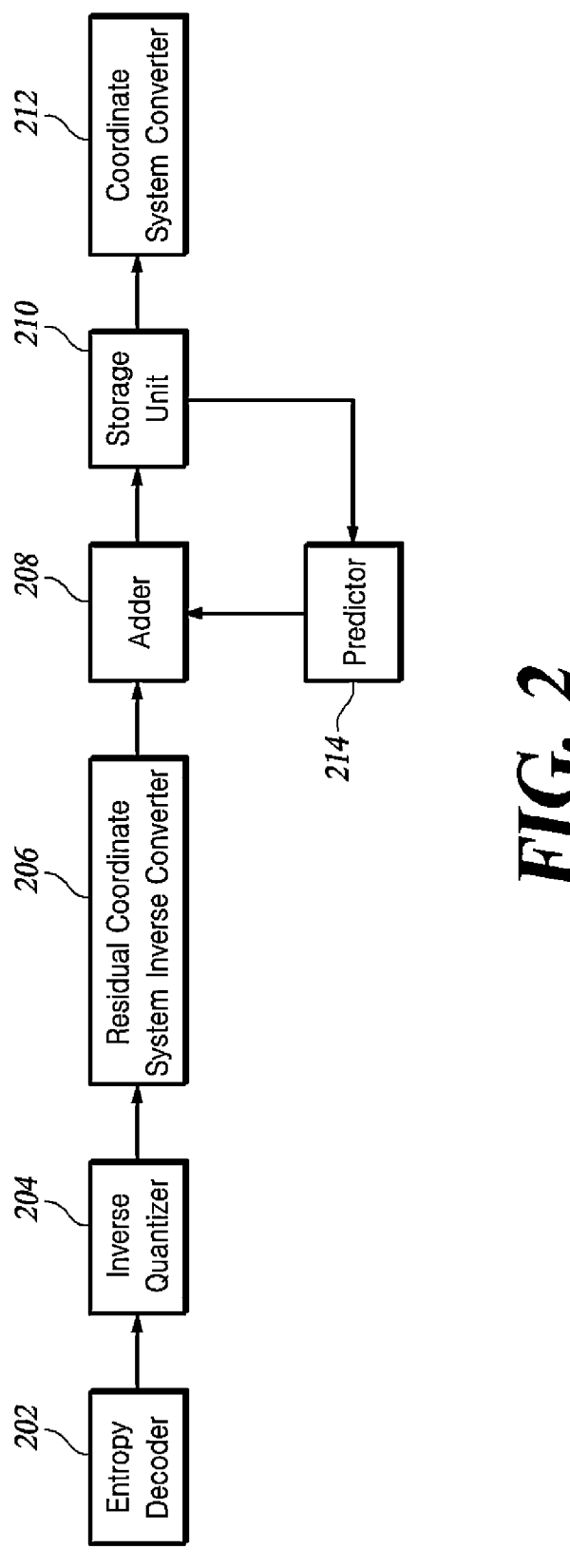
FIG. 2 is a block diagram of a point cloud decoding device, according to at least one embodiment of the present disclosure.

FIG. 2 is a block diagram of a point cloud decoding device, according to at least one embodiment of the present disclosure.

The point cloud decoding device (hereinafter, used interchangeably with 'decoding device') according to this embodiment decodes points on a per coding block basis to generate a LiDAR point cloud. The decoding device includes all or some of an entropy decoder 202, an inverse quantizer 204, a residual coordinate system inverse converter 206, an adder 208, a storage unit 210, a coordinate system converter 212, and a predictor 214.

The entropy decoder 202 may entropy decode the bitstream received from the encoding device to generate a quantized residual block. The generated residual block may be provided to the inverse quantizer 204. Additionally, to be used in the decoding device, the entropy decoder 202 may decode various parameters having been used by the encoding device. The parameters may include, for example, a quantization parameter, information for the residual coordinate system conversion, and the like. Other information that the parameters may include is described in more detail below.

The inverse quantizer 204 may use the quantization parameter to inversely quantize the quantized residual block to reconstruct the residual block. The reconstructed residual block may be provided to the residual coordinate system inverse converter 206.

The residual coordinate system inverse converter 206 may use the information for the residual coordinate system conversion to inversely convert the coordinate system of geometric information for the received reconstructed residual block. The inversely converted residual block may be provided to the adder 208.

The adder 208 may sum the coordinate system inverse-converted residual block and the prediction block received from the predictor 214 to reconstruct the coding block. The reconstructed coding block may be provided to the storage unit 210.

The storage unit 210 may store the reconstructed coding block in a buffer. The stored points may be transmitted to the predictor 214 for subsequent reconstruction of the points. Additionally, the stored point cloud may be transmitted to the coordinate system converter 212 to be output therefrom.

The predictor 214 may use the stored reconstructed points to predict the current coding block and thereby generate a prediction block. The generated prediction block may be provided to the adder 208.

The coordinate system converter 212 may perform coordinate system convert to output the stored points. In an embodiment, the coordinate system converter 212 may convert the coordinate system exclusive to geometric information for the frame of the point cloud from the decoding device's internal coordinate system to the world coordinate system.

Figure 3:
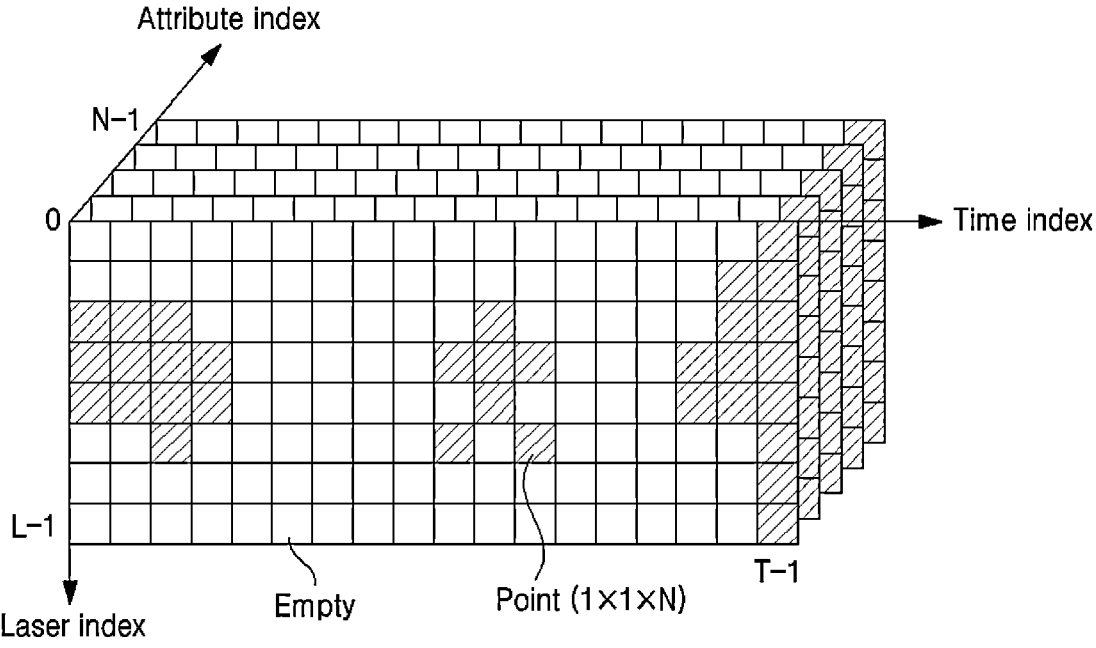
FIG. 3 is a diagram illustrating a LiDAR point cloud, according to at least one embodiment of the present disclosure.

FIG. 3 is a diagram illustrating a LiDAR point cloud, according to at least one embodiment of the present disclosure.

To obtain LiDAR point cloud information, i.e. LiDAR parameters, LiDAR may use multiple lasers. As illustrated in FIG. 3, a laser index may be assigned to each laser. For points obtained from each indexed laser, information on the points may be obtained at every moment. As illustrated in FIG. 3, the time at which the information is obtained may be expressed as a time index from the start of obtaining thereof.

Additionally, attribute information may be determined according to the characteristics of the LiDAR. The attribute information may have multiple channels (hereinafter, 'attribute channels' or 'attribute values'). The respective channels may represent an occupancy indicating the presence of a point, a reflectance referring to the reflection coefficient of light, a distance between the LiDAR and the object, R, G, B, Y, Cb, Cr, Co, and Cg indicating the color of the object, and the like. Because common LiDAR includes reflectance and the distance between the LiDAR and the object, two channels may be generated as the attribute information. When the coordinate system representing the geometric information of points is an orthogonal coordinates system, only one channel of the reflectance may exist as the attribute information. As illustrated in FIG. 3, attribute indexes may be assigned respectively to the channels of attribute information.

Figure 4:
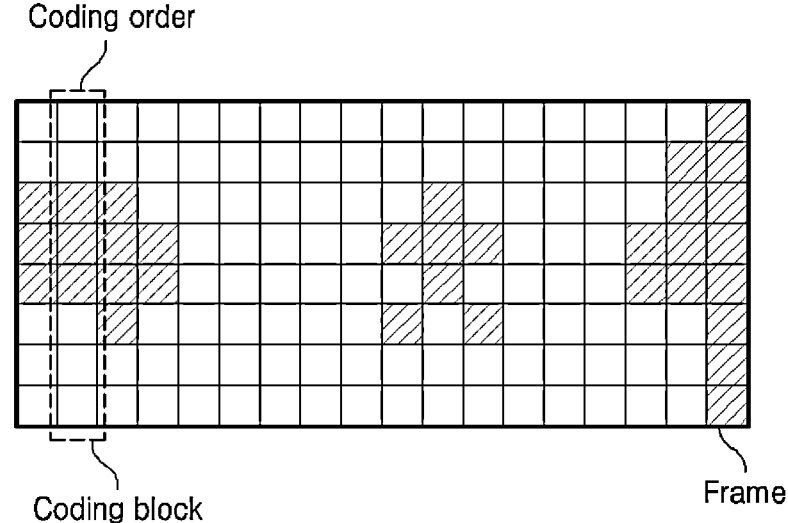
FIG. 4 is a diagram illustrating a method of dividing a LiDAR point cloud, according to at least one embodiment of the present disclosure.

FIG. 4 is a diagram illustrating a method of dividing a LiDAR point cloud, according to at least one embodiment of the present disclosure.

The encoding device may receive the number of lasers used to obtain points from LiDAR, the number of attribute values in the attribute information, the rotating angular speed of each laser, and the total rotation angle of each laser, and may generate one frame as shown in the example in FIG. 4. The frame may be a set of points and may have one or multiple attribute values. Depending on the presence or absence of points, empty space may exist within the frame. The vertical length of the frame may be equal to the number of lasers. Additionally, the horizontal length of the frame may be an integer value generated by dividing the total rotation angle of each laser by the rotating angular speed thereof.

In an embodiment, one column in the vertical direction may include points obtained by each laser at close times to each other. Accordingly, the encoding device or decoding device may use one column containing points with close capture times as a coding block that is a coding unit. Additionally, the encoding device or decoding device may sequentially encode/decode the columns one by one from the leftmost column to the right.

Figure 5:
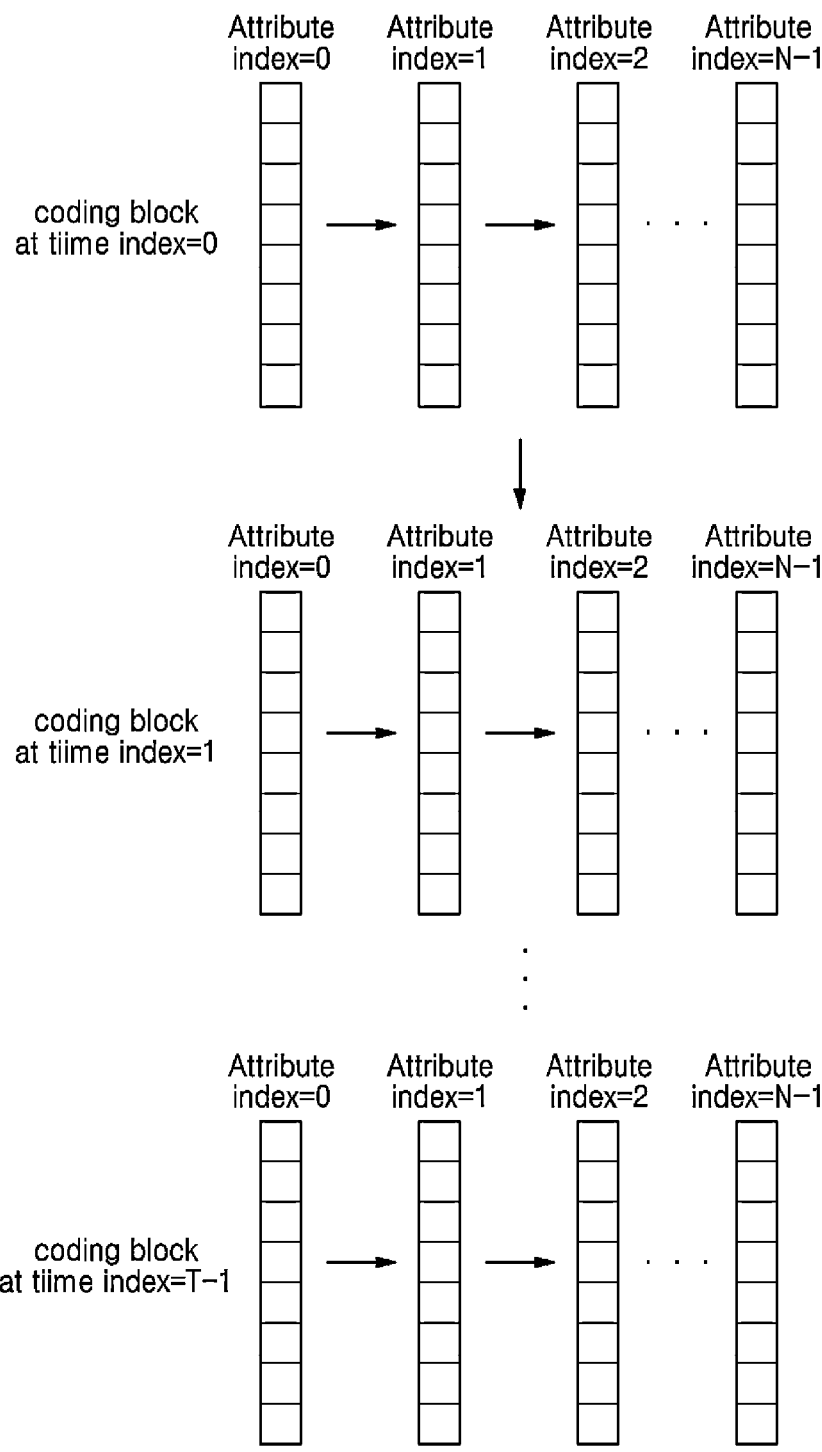
FIG. 5 is a diagram illustrating the encoding/decoding order of coding blocks, according to at least one embodiment of the present disclosure.

FIG. 5 is a diagram illustrating the encoding/decoding order of coding blocks, according to at least one embodiment of the present disclosure.

As in the example of FIG. 4, when one column is determined to be a coding block, the one coding block may include multiple attribute channels. As described above, each attribute value may have an attribute index indicating the relevant attribute. Additionally, for commonly used attribute channels, the same attribute index may be used according to an agreement between the encoding device and the decoding device. For rarely used attribute channels, the encoding device may obtain an additional attribute index from its user and then may transmit the additional attribute index to the decoding device.

As shown in the examples of FIGS. 3 and 5, each coding block may have N attribute values (N is a natural number of 1 or more). Accordingly, the encoding device or decoding device may sequentially encode or decode N attribute values for each coding block. Upon completing encoding/decoding for one coding block, encoding/decoding may be performed for the next coding block.

Figure 6:
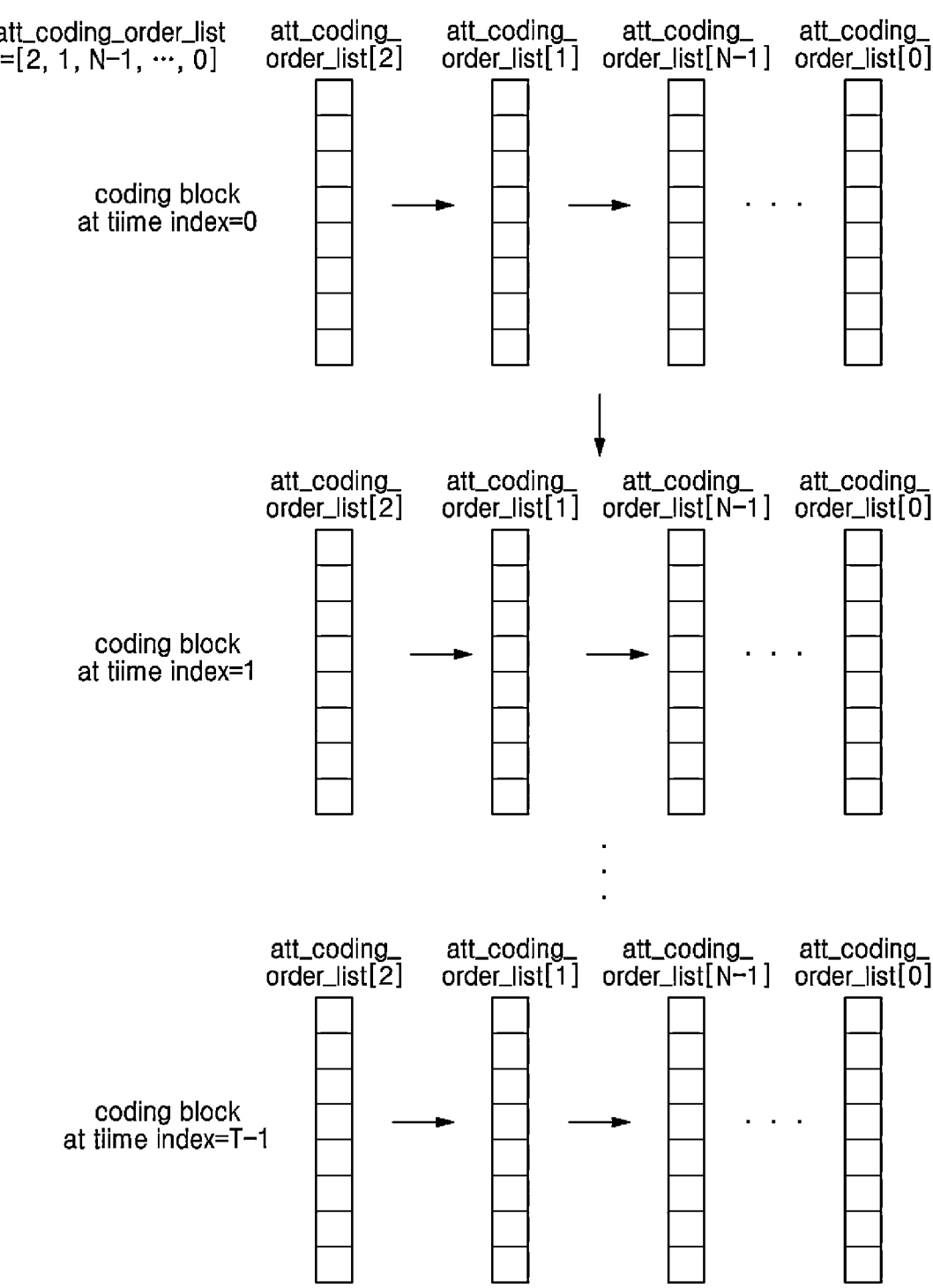
FIG. 6 is a diagram illustrating the encoding/decoding order of coding blocks using an attribute coding order list, according to at least one embodiment of the present disclosure.

FIG. 6 is a diagram illustrating the encoding/decoding order of coding blocks using an attribute coding order list, according to at least one embodiment of the present disclosure.

When one column is determined to be a coding block as in the example of FIG. 4, the encoding device or decoding device may encode or decode the coding block in the order shown in FIG. 6. To determine the coding order, the encoding device may generate a list containing the encoding/decoding order of attribute values of the coding block. As illustrated in FIG. 6, when the coding block includes N attribute values, this embodiment may generate att_coding_order_list, where att_coding_order_list is an attribute coding order list with a length of N or less. For example, all attribute channels may be encoded/decoded based on the attribute coding order list. Alternatively, only specific attribute channels may be encoded/decoded.

In an embodiment, attribute indexes included in the attribute coding order list may not be sorted in ascending or descending order. For example, in terms of optimizing coding efficiency, the encoding device may determine the encoding order of attribute values. Alternatively, encoding/decoding of attribute values may be performed in a particular order as agreed upon between the encoding device and the decoding device. For example, if the attribute information of the current coding block includes point occupancy and depth, the encoding device may encode the occupancy and then may encode the depth by using the reconstructed occupancy, thereby efficiently encoding the depth. As described above, the encoding device may determine the attribute coding order list based on redundancy between attribute channels.

Figure 7:
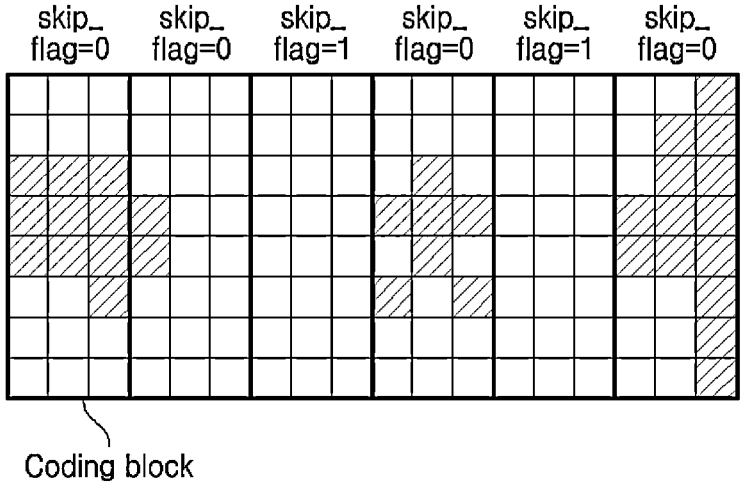
FIG. 7 is a diagram illustrating coding blocks including a plurality of columns, according to at least one embodiment of the present disclosure.

FIG. 7 is a diagram illustrating coding blocks including a plurality of columns, according to at least one embodiment of the present disclosure.

As described above, a frame, slice, or tile representing a LiDAR point cloud may be divided into multiple coding blocks. As illustrated in FIG. 7, one coding block may include one or multiple columns. When a coding block includes multiple columns, the encoding device or decoding device may perform coding-block encoding or decoding in the order illustrated in FIGS. 5 and 6.

In some embodiments, depending on the presence or absence of points within each coding block, encoding/decoding of the relevant coding block may be omitted. The encoding device checks the presence or absence of points in the coding block and sets skip_flag to 0 if there are one or more points. On the other hand, the encoding device may determine skip_flag to 1 when there is not a single point inside the coding block. The determined skip_flag may be encoded by the entropy encoder 112 of the encoding device and then signaled to the decoding device.

In some cases, since the LiDAR point cloud may include a very small number of points, very few points may exist in one frame. To improve the coding efficiency of skip_flag, the encoding device may bundle multiple coding blocks into one and then determine skip_flag on the bundle. Therefore, if skip_flag is 1, encoding/decoding of the bundled blocks may be omitted. Alternatively, the encoding device may encode the number of coding blocks for which encoding/decoding is omitted. The encoding device may then transmit the encoded number to the decoding device. Alternatively, the encoding device may variably determine the size of the coding block.

Figure 8:
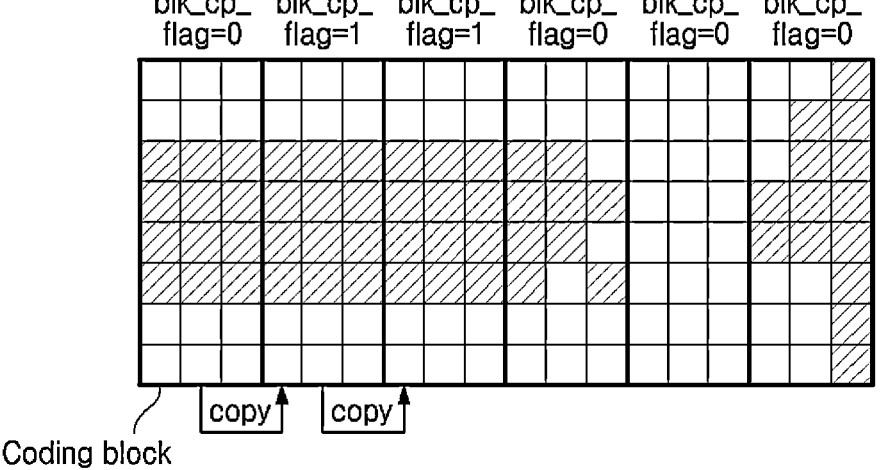
FIG. 8 is a diagram illustrating a generation of prediction block for a current coding block, according to at least one embodiment of the present disclosure.

FIG. 8 is a diagram illustrating a generation of prediction block for a current coding block, according to at least one embodiment of the present disclosure.

Two consecutive coding blocks are likely to include LiDAR points reflected from the same object. Therefore, a previously reconstructed coding block may be used as a prediction block for the current coding block. As illustrated in FIG. 8, the encoding device may be responsive to each coding block for encoding blk_cp_flag, where blk_cp_flag is a flag indicating whether to use the previously reconstructed block as a prediction block. The encoding device may then signal the encoded blk_cp_flag to the decoding device. Upon decoding blk_cp_flag, the decoding device checks whether blk_cp_flag=0, and if yes, the decoding device uses a different prediction method. On the other hand, when blk_cp_flag=1, the decoding device may use the reconstructed attribute values of the previous coding block as the predicted attribute values of the current coding block.

The encoding device may generate a residual block by subtracting the predicted attribute values from the original attribute values. Additionally, the decoding device may sum the predicted attribute values and the residual block to generate reconstructed attribute values.

Figure 9:
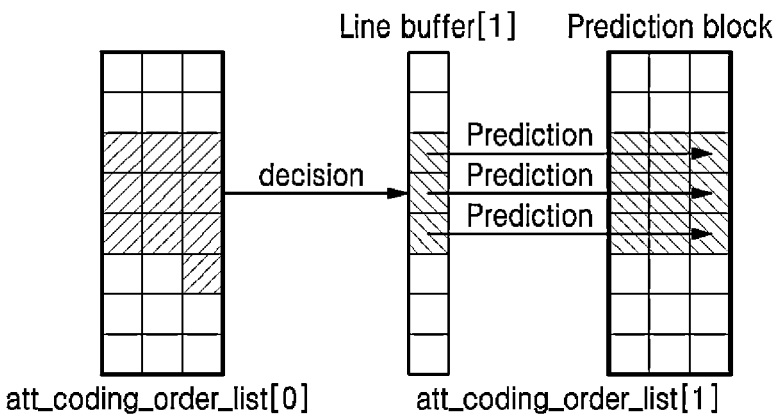
FIG. 9 is a diagram illustrating a prediction method using information between attribute values of a coding block, according to at least one embodiment of the present disclosure.

FIG. 9 is a diagram illustrating a prediction method using information between attribute values of a coding block, according to at least one embodiment of the present disclosure.

As described above, one coding block may include multiple attribute values. Additionally, the encoding device or decoding device may encode or decode attribute values of points in the current coding block according to the attribute coding order list. The encoding device or decoding device may predict the current attribute values by using other previously reconstructed attribute values for each point.

For example, by using reconstructed previous attribute values, the locations of points may be confirmed, as shown in the example of FIG. 9. Therefore, when using attribute values stored in the line buffer while recognizing the positions of the points, the encoding device or decoding device may predict only the point positions that exist in the current coding block and thereby generate a prediction block from the attribute values stored in the line buffer. The line buffer may be filled with attribute values of the right column of the coding block located to the left of the current coding block. Alternatively, the line buffer may be filled with attribute values of the left column of the current coding block.

Figure 10:
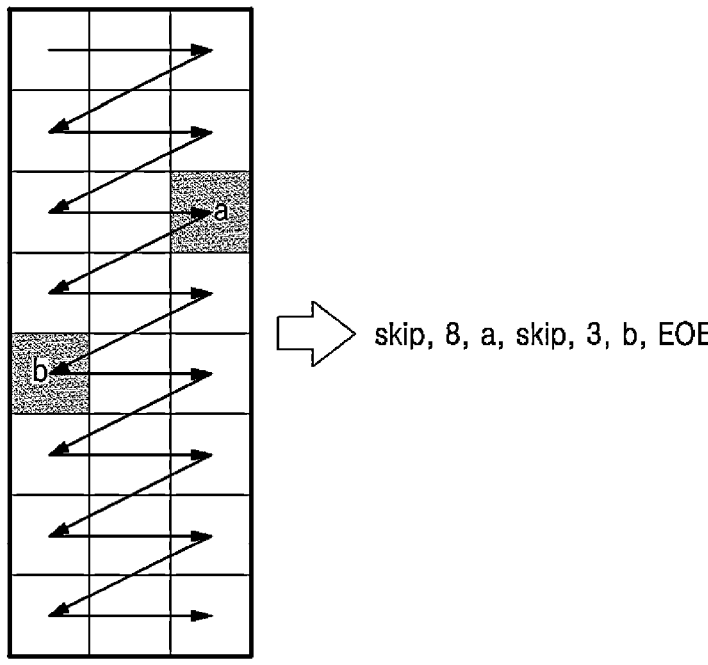
FIG. 10 is a diagram illustrating the encoding of a residual block, according to at least one embodiment of the present disclosure.

FIG. 10 is a diagram illustrating the encoding of a residual block, according to at least one embodiment of the present disclosure.

As in the example of FIG. 10, a small number of points may exist in one residual block. In the example of FIG. 10, the two points each have attribute value a or b. With respect to the two points, the encoding device may encode the block's internal coordinates and encode their relevant attribute values.

As another example, the encoding device may express the positions of the points by encoding a bundle between a skip symbol indicating no point being present and a value indicating the number of skip positions. As illustrated in FIG. 10, the position of the next point may be expressed by using a bundle of (skip, 8). The encoding device may encode 'a', which is the attribute value of the next point. Afterwards, in the same manner as the previous method, the encoding device may encode a bundle (skip, 3) representing 3, which is the number of positions skipped before reaching the next point. The encoding device may encode the attribute value 'b' of the next point and then encode EOB (End of Block) which is a symbol indicating the last point.

The entropy encoder 112 of the encoding device may generate a bitstream by encoding an array of generated symbols. The decoding device may perform the above-described process in reverse and thereby inversely transform the array of symbols into a residual block.

Figure 12:
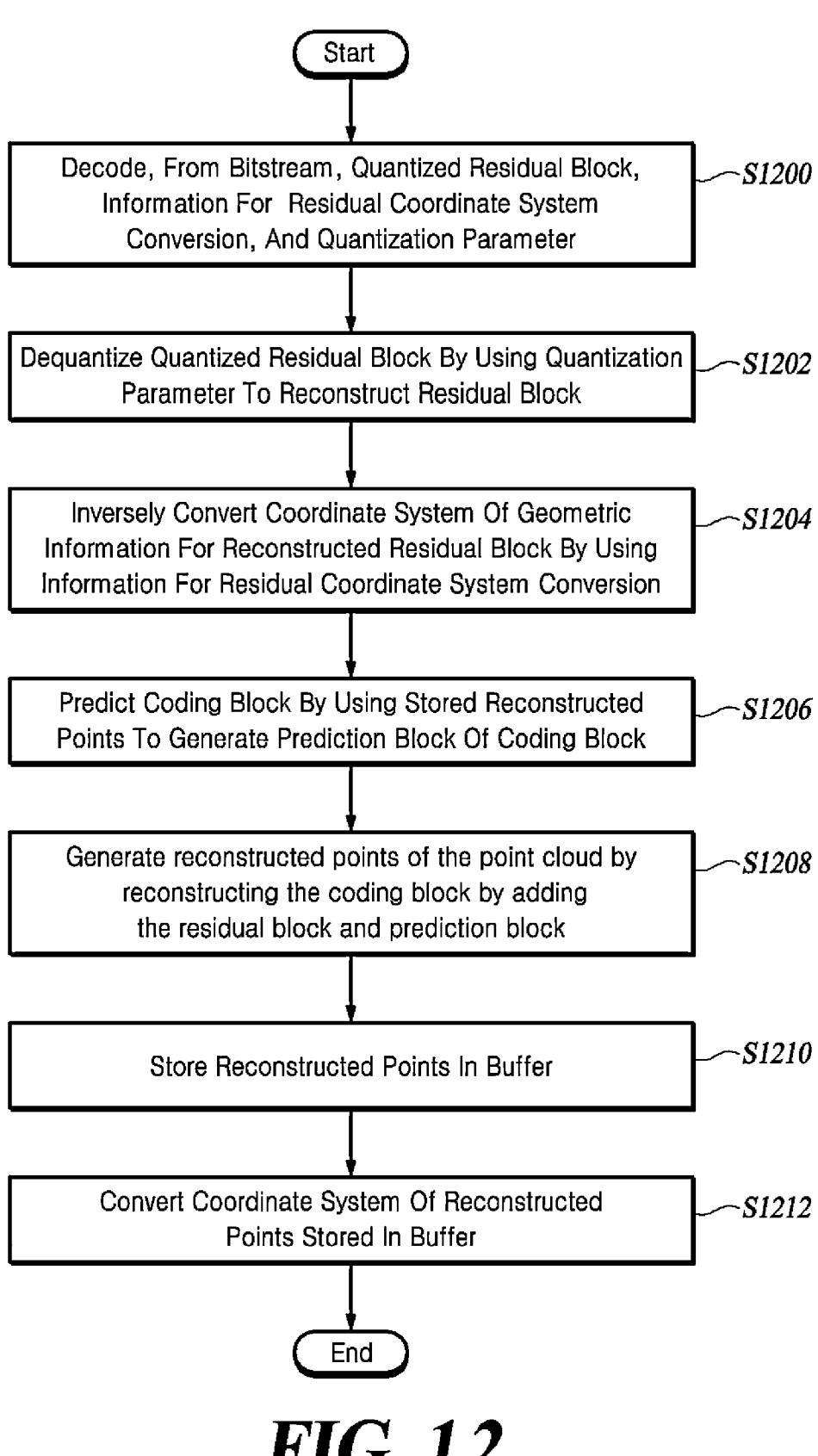
FIG. 12 is a flowchart of a method of decoding a LiDAR point cloud, according to at least one embodiment of the present disclosure.

The following describes, using the illustrations of FIGS. 11 and 12, a method performed by the encoding device or decoding device for encoding or decoding a LiDAR point cloud, according to embodiments.

FIG. 11 is a flowchart of a method of encoding a LiDAR point cloud, according to at least one embodiment of the present disclosure.

In an operation S1110, the encoding device obtains a frame of the point cloud.

The point cloud may have different coordinate systems depending on the output format of the LiDAR. Therefore, the frame of the point cloud may need a conversion of the coordinate system of geometric information from the coordinate system of the point cloud to the coordinate system used inside the encoding device.

In an operation S1102, the encoding device converts the coordinate system of the frame to the internal coordinate system of the encoding device.

In an operation S1104, the encoding device obtains a coding block divided from the frame. The encoding device may turn or divide the coordinate system-converted frame into one or multiple slices or tiles. Further, the encoding device may turn or divide one tile or slice into one or multiple coding blocks. The encoding device obtains one coding block for encoding per a coding block basis.

In an operation S1106, the encoding device predicts the coding block by using the stored reconstructed points to generate a prediction block.

In an operation S1108, the encoding device subtracts the prediction block from the coding block to generate a residual block.

In an operation S1110, the encoding device determines information for a residual coordinate system conversion. The encoding device determines the information for the residual coordinate system conversion to convert the coordinate system of the residual block into an efficient coordinate system in terms of encoding.

In an operation S1112, the encoding device converts the coordinate system of geometric information for the residual block by using the information for the residual coordinate system conversion.

In an operation S1114, the encoding device determines the quantization parameter.

In an operation S1116, the encoding device quantizes the residual block by using the quantization parameter.

In an operation S1118, the encoding device encodes the quantized residual block and parameters to generate a bitstream.

The parameters include the quantization parameter and the information for the residual coordinate system conversion. Depending on the encoding method of the coding block, the parameters may further include a flag of skip_flag for indicating the presence or absence of points in the coding block, an attribute coding order list, and a flag of blk_cp_flag for indicating whether to use a previously reconstructed block.

In an operation S1120, the encoding device dequantizes the quantized residual block by using the quantization parameter and thereby reconstructs the residual block.

In an operation S1122, the encoding device inversely converts the coordinate system of geometric information by using the information for the residual coordinate system conversion for the reconstructed residual block.

In an operation S1124, the encoding device reconstructs the coding block by adding the reconstructed residual block and the prediction block, thereby generating reconstructed points of the point cloud.

In an operation S1126, the encoding device stores the reconstructed points in a buffer.

FIG. 12 is a flowchart of a method of decoding a LiDAR point cloud, according to at least one embodiment of the present disclosure.

In an operation S1200, the decoding device decodes, from the bitstream, the quantized residual block and parameters. The parameters include a quantization parameter and the information for a residual coordinate system conversion. Depending on how the coding block was encoded, parameters may contain additional information.

In an operation S1202, the decoding device dequantizes the quantized residual block by using the quantization parameter and thereby reconstructs the residual block.

In an operation S1204, the decoding device uses the information for the residual coordinate system conversion to inversely convert the coordinate system of geometric information for the residual block.

In an operation S1206, the decoding device uses the stored reconstructed points to predict the coding block and thereby generates a prediction block of the coding block.

In an operation S1208, the decoding device reconstructs the coding block by adding the residual block and the prediction block, thereby generating reconstructed points within the frame of the point cloud.

In an operation S1210, the decoding device stores the reconstructed points in a buffer.

In an operation S1212, the decoding device converts the coordinate system of the reconstructed points stored in the buffer. The decoding device may convert the coordinate system exclusive to geometric information for the frame of the point cloud from the internal coordinate system of the decoding device to the world coordinate system.

Although the steps in the respective flowcharts are described to be sequentially performed, the steps merely illustrate the technical idea of some embodiments of the present disclosure. Therefore, a person having ordinary skill in the art to which the present disclosure pertains would readily understand that the steps may be performed in sequences different from the sequences illustrated in the respective drawings and/or two or more of the steps may be performed in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Various methods or functions described herein, in some embodiments, may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which the present disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the present disclosure is not limited by the illustrations. Accordingly, those having ordinary skill in the art to which the present disclosure pertains should understand that the scope of the present disclosure should not be limited by the above explicitly described embodiments but by the appended claims and equivalents thereof.

REFERENCE NUMERALS

202: entropy decoder
204: inverse quantizer
206: residual coordinate system inverse converter
208: adder
210: storage unit
212: coordinate system converter
214: predictor

What is claimed is:

1. A method performed by a point cloud decoding device for decoding a point cloud, the method comprising:
decoding a quantized residual block and a quantization parameter from a bitstream;
reconstructing a residual block by dequantizing the quantized residual block by using the quantization parameter;
generating a prediction block of a coding block by predicting the coding block by using stored reconstructed points;
generating reconstructed points within a frame of the point cloud by reconstructing the coding block by adding the residual block and the prediction block;
storing the reconstructed points in a buffer; and
converting a coordinate system of the reconstructed points stored in the buffer,
wherein the frame includes a set of points obtained by LiDAR, wherein the frame has a vertical length that is equivalent to a certain number of lasers and a horizontal length that is an integer value generated by dividing a total rotation angle of each laser by a rotating angular speed of each laser, and
wherein the points each have N attribute values as attribute information, where N is a natural number equal to or greater than 1.

2. The method of claim 1, further comprising:
decoding information for a residual coordinate system conversion from the bitstream; and
inversely converting a coordinate system of geometric information of the residual block by using the information for the residual coordinate system conversion.

3. The method of claim 1, wherein converting the coordinate system includes, with respect to the point cloud including the reconstructed points stored in the buffer, converting a coordinate system of geometric information from an internal coordinate system of the point cloud decoding device to a world coordinate system.

4. The method of claim 1, wherein:
the coding block includes one column in the frame; and
decoding the quantized residual block and the quantization parameter includes decoding the frame sequentially from a leftmost column toward a right side.

5. The method of claim 1, wherein:
the coding block includes at least one or more columns in the frame; and
decoding the quantized residual block and the quantization parameter includes decoding a flag indicating a presence or an absence of points in the coding block, and generating the quantized residual block based on the flag.

6. The method of claim 5, wherein decoding the quantized residual block and the quantization parameter includes generating the quantized residual block by decoding the N attribute values sequentially according to an attribute index with respect to the coding block.

7. The method of claim 5, wherein decoding the quantized residual block and the quantization parameter includes:
decoding, from the bitstream, an attribute coding order list having a length of N or less; and
generating the quantized residual block by decoding the N attribute values according to the attribute coding order list.

8. The method of claim 7, wherein generating the prediction block includes, when decoding the N attribute values according to the attribute coding order list with respect to the points in the coding block, predicting a current attribute value for each point by using a previously reconstructed different attribute value.

9. The method of claim 5, wherein decoding the quantized residual block and the quantization parameter includes, with respect to the points in the coding block, decoding coordinates of each point in the coding block and decoding the N attribute values of each of the points to generate the quantized residual block.

10. The method of claim 5, wherein generating the prediction block includes:
decoding a flag indicating whether a previously reconstructed block is to be used; and
when the flag is true, utilizing attribute values of the previously reconstructed block as predicted attribute values of the coding block.

11. A method performed by a point cloud encoding device for encoding a point cloud, the method comprising:
obtaining a frame of the point cloud;
converting a coordinate system of the frame into a coordinate system internal to the point cloud encoding device;
obtaining a coding block divided from the frame;
generating a prediction block of the coding block by predicting the coding block by using stored reconstructed points;
subtracting the prediction block from the coding block to generate a residual block;
determining a quantization parameter;
quantizing the residual block by using the quantization parameter; and
encoding a quantized residual block and the quantization parameter,
wherein the frame includes a set of points obtained by LiDAR, wherein the frame has a vertical length that is equivalent to a certain number of lasers and a horizontal length that is an integer value generated by dividing a total rotation angle of each laser by a rotating angular speed of each laser, and wherein the points each have N attribute values as attribute information, where N is a natural number equal to or greater than 1.

12. The method of claim 11, further comprising:

determining information for a residual coordinate system conversion;

converting a coordinate system of geometric information with respect to the residual block by using the information for the residual coordinate system conversion; and encoding the information for the residual coordinate system conversion.

13. The method of claim 12, further comprising:

generating a reconstructed residual block by dequantizing the quantized residual block with the quantization parameter;

inversely converting the coordinate system of geometric information with respect to the reconstructed residual block by using the information for the residual coordinate system conversion;

generating reconstructed points of the point cloud by reconstructing the coding block by adding the reconstructed residual block and the prediction block; and storing the reconstructed points in a buffer.

14. A non-transitory computer-readable recording medium storing a bitstream generated by a point cloud encoding method, wherein the point cloud encoding method comprises:

obtaining a frame of a point cloud;

converting a coordinate system of the frame into a coordinate system internal to a point cloud encoding device;

obtaining a coding block divided from the frame;

generating a prediction block of the coding block by predicting the coding block by using stored reconstructed points;

subtracting the prediction block from the coding block to generate a residual block;

determining a quantization parameter;

quantizing the residual block by using the quantization parameter; and encoding a quantized residual block and the quantization parameter, wherein the frame includes a set of points obtained by LiDAR, wherein the frame has a vertical length that is equivalent to a certain number of lasers and a horizontal length that is an integer value generated by dividing a total rotation angle of each laser by a rotating angular speed of each laser, and wherein the points each have N attribute values as attribute information, where N is a natural number equal to or greater than 1.

* * * * *